United States Patent
Müller et al.

(10) Patent No.: US 7,484,431 B2
(45) Date of Patent: *Feb. 3, 2009

(54) PORTABLE HANDHELD WORK APPARATUS

(75) Inventors: Matthias Müller, Remshalden (DE); Harald Schliemann, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 346 days.

This patent is subject to a terminal disclaimer.

(21) Appl. No.: 10/891,012

(22) Filed: Jul. 15, 2004

(65) Prior Publication Data

US 2005/0011298 A1 Jan. 20, 2005

(30) Foreign Application Priority Data

Jul. 16, 2003 (DE) ................. 103 32 242

(51) Int. Cl.
*F16C 1/10* (2006.01)
*F16C 1/12* (2006.01)
*F02D 11/02* (2006.01)
*F02D 11/04* (2006.01)

(52) U.S. Cl. ............. 74/502.2; 74/501.6; 123/398; 123/400

(58) Field of Classification Search ......... 74/502.2, 74/501.6, 526, 527, 473.14; 123/398, 400; 30/276

See application file for complete search history.

(56) References Cited

U.S. PATENT DOCUMENTS

| 1,341,762 | A | * | 6/1920 | Ross ................. 123/398 |
| 4,528,954 | A | * | 7/1985 | Slattery ............. 123/406.74 |
| 4,967,543 | A |   | 11/1990 | Scag et al. |
| 5,065,643 | A |   | 11/1991 | Axtell |
| 5,481,934 | A | * | 1/1996 | Tagawa ............. 74/473.14 |
| 5,660,082 | A | * | 8/1997 | Hsieh ............... 74/502.2 |
| 5,862,713 | A | * | 1/1999 | Tsunoda et al. ..... 74/526 |
| 5,934,149 | A |   | 8/1999 | Tuda |
| 6,039,024 | A |   | 3/2000 | Carlson et al. |
| 6,125,547 | A | * | 10/2000 | Nagashima ......... 30/276 |
| 6,209,412 | B1 | * | 4/2001 | Hiratsuna et al. .... 74/502.2 |
| 6,666,187 | B2 | * | 12/2003 | Dahlberg et al. .... 123/398 |
| 6,892,603 | B2 | * | 5/2005 | Barnett ............. 74/502.2 |
| 7,000,593 | B2 | * | 2/2006 | Muller et al. ....... 123/398 |

* cited by examiner

*Primary Examiner*—Vinh T. Luong
(74) *Attorney, Agent, or Firm*—Walter Ottesen

(57) ABSTRACT

A portable handheld apparatus such as a brushcutter, blower or the like has a drive motor and a throttle lever (2). The throttle lever (2) is pivotally journalled about a rotational axis (3). The throttle lever (2) acts on an actuating device for controlling the drive motor. In order to make possible a simple adjustment of the actuating device, it is provided that the throttle lever (2) has an operator-controlled lever (6) and an actuating lever (5). The operator-controlled lever (6) can be actuated by the operator. The actuating lever (5) acts on the actuating device. The relative position of the actuating lever (5) relative to the operator-controlled lever (6) is adjustable.

23 Claims, 3 Drawing Sheets

PORTABLE HANDHELD WORK APPARATUS

CROSS REFERENCE TO RELATED APPLICATION

This application claims priority of German patent application no. 103 32 242.6, filed Jul. 16, 2003, the entire content of which is incorporated herein by reference.

FIELD OF THE INVENTION

The invention relates to a portable handheld work apparatus such as a blower, brushcutter or the like.

BACKGROUND OF THE INVENTION

U.S. Pat. No. 5,934,149 discloses a brushcutter having an operator-controlled lever. The operator-controlled lever is pivotally journalled in a housing and a bowden cable is fixed to the operator-controlled lever. The throttle lever acts on the wire of the bowden cable. The outer tube of the bowden cable is adjustably fixed on the housing via a gnarled screw.

In work apparatus wherein the drive motor thereof is actuated via an actuating device such as a bowden cable, the length of the bowden cable must be so matched that the full-load position is obtained when the throttle lever is fully actuated and the idle position is reached when the throttle lever is not actuated. The throttle lever and the drive motor, especially in a brushcutter, are mounted at a distance from each other. For this reason, the adjustment is complex.

SUMMARY OF THE INVENTION

It is an object of the invention to provide a work apparatus of the kind described above wherein a simple configuration is provided and wherein a simple adjustment of the throttle lever and the actuating device is made possible.

The portable handheld work apparatus of the invention has a drive motor and includes: an actuating arrangement for controlling the drive motor; a throttle lever pivotally journalled on a rotational axis and being operatively connected to the actuating arrangement for acting on the actuating arrangement to control the drive motor; the throttle lever including an operator-controlled lever actuable by an operator and an actuating lever for acting on the actuating arrangement; and, the actuating arrangement including the actuating lever and further including means for adjusting a position of the actuating lever relative to the operator-controlled lever.

The throttle lever has an operator-controlled lever and an actuating lever whose relative positions are adjustable with respect to each other. In this way, the actuating device, especially the bowden cable, can be fixedly mounted to the throttle lever and the adjustment of the idle position and of the full-load position can then be made at the throttle lever. The adjustment is possible in this way in a simple manner. At the same time, the two-part throttle lever has a simple assembly so that complex adjusting devices are not necessary.

It is practical that the actuating lever is supported on the operator-controlled lever. The actuating lever is especially pivotally journalled about the rotational axis. The pivotal support is simply configured and causes little wear. Adequately large adjusting movements can be obtained via the pivotal arrangement. It is practical to provide a set element for adjusting the relative position of the actuating lever relative to the operator-controlled lever. In order to make possible a simple adjustment, the throttle lever is pivotally supported in a housing and the set element can be accessed by the operator from the outside of the housing. In this way, a readjustment is also possible at any time in a simple manner. A simple configuration is achieved when the throttle lever has an opening which extends through the operator-controlled lever from the end thereof projecting to the housing outer side in a direction toward the actuating lever and in which opening the set element is mounted. Because of the opening, the set element is accessible from the outer side of the housing. Only few components are needed for the adjustment. A simple configuration of the work apparatus results. A fine adjustment can be obtained when the set element is a screw. The screw operates especially against the actuating lever so that no further components are needed for the adjustment.

The actuating lever is configured to be approximately L-shaped. The actuating lever is journalled at the end of the first leg and engages the actuating device at the end of the second leg. Advantageously, the set element operates in the connecting region of the two legs of the actuating lever. In order to obtain an adequate displacement path, it is provided that the distance of the application point of the set element at the actuating lever to the rotational axis is less than the distance of the application point of the actuating device to the rotational axis. In order to ensure that the actuating lever is in contact against the operator-controlled lever for each operating state, it is provided that the actuating lever is spring biased in a direction toward the operator-controlled lever. The actuating lever is especially biased by a torsion spring. A simple configuration results when the actuating device includes a bowden cable which is fixed on the actuating lever.

It is provided that the work apparatus has a position lever which has a fixing position and an operating position. The throttle lever can be fixed in at least one position in the fixed position and the throttle lever is enabled in the operating position. Accordingly, the selection of an operating state is possible via the position lever wherein the operator need not continuously actuate the throttle lever. In order to release the throttle lever from the fixation, the position lever is rotated into the operating position wherein the throttle lever is enabled and can be actuated in the usual manner. It is practical to fix the throttle lever in fixed position to the position lever via a latch lever. The latch lever is spring biased especially in a direction toward its latch position. A simple configuration results when the latch lever is loaded by a torsion spring which is supported at the actuating lever with one leg and at the latch lever with the other leg. In this way, it can be ensured with the torsion spring that the actuating lever lies against the operator-controlled lever in each operating state as well as that the latch lever in its latch position reliably fixes the throttle lever. In the operating position, the position lever acts opposite to the spring force on the latch lever. In the operating position of the position lever, the latch lever is pressed out of its latch position so that the throttle lever is enabled by the latch lever. The latch lever has a latch projection which works together with latch detents in the fixed position of the position lever. The latch detents are formed on the operator-controlled lever.

In order to make possible a switchoff of the drive motor in a simple manner, it is provided that the position lever has an off position wherein the position lever actuates a contact spring which interrupts the ignition of the drive motor. To ensure that the actuating devices is not actuated with a new start of the drive motor and the drive motor thereby is in the idle position, it is provided that the operating position of the position lever is arranged between the fixed position and the off position. In this way, it is avoided that the throttle lever is fixed for a renewed start of the motor via the latch lever in the full-load position or in another operating position. Via the spring, the actuating lever and therewith the throttle lever is pressed into the idle position. In this way, it is ensured that the motor can be started anew.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
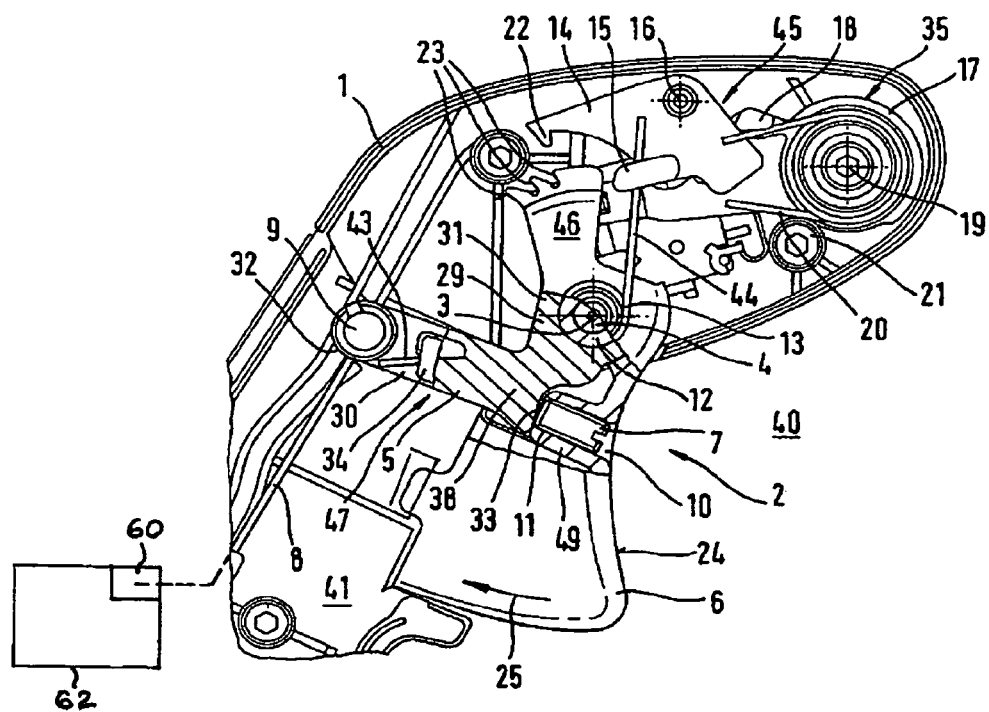
FIGS. 1 to 5 show section views of the housing of a work apparatus in the region of the throttle lever.

In FIG. 1, the housing of a blower is shown in the region of the throttle lever. The housing 1 can, however, also be the housing of another work apparatus such as a brushcutter or the like. In the housing 1, a throttle lever 2 is pivotally journalled about a rotational axis 3. The throttle lever 2 has an operator-controlled element 6 which projects to the outer side 40 of the housing 1. The operator-controlled element 6 has a surface 24 on which the hand of the operator is applied and can actuate the lever 6 in the direction of the arrow 25. The operator-controlled lever 6 has a bearing busing 12 which is supported on a bolt 4 of the housing 1 about the rotational axis 3. An actuating lever 5 is pivotally journalled about the rotational axis 3 on the bearing bushing 12. The actuating lever 5 is configured to have an approximate L-shape. The first leg 29 of the actuating lever 5 is journalled at its end 31 on the bearing bushing 12. The second leg 30 of the actuating lever 5 extends transversely to the first leg 29 and has a holder 9 at its end 32. The actuating arrangement of the work apparatus can include, for example, a bowden cable. The bowden cable 8 is fixed in the holder 9. The end 31 of the actuating lever 5 is the section of the leg 29, which faces away from the leg 30, and the end 32 of the actuating lever 5 is the section of the leg 30 which faces away from the leg 29. In the connecting region 38 between the legs 29 and 30, the actuating lever 5 lies in an application point 33 against a screw 7. The screw 7 is configured as a set screw and is threadably engaged in a winding 11 of a bore 10 in the operator-controlled lever 6. The bore 10 extends from the operating surface 24 through the operator-controlled lever 6 in a direction toward the actuating lever 5. The bore 10 is aligned approximately in the extension of the second leg 30 of the actuating lever 5.

The actuating lever 5 is spring biased in a direction toward the set screw 7 by a torsion spring 13. The torsion spring 13 is journalled concentrically to the rotational axis 3 on the operator-controlled lever 6. The first leg 43 of the torsion spring 13 is braced against a holder 34 which is fixed on the second leg 30 of the actuating lever 5. The second leg 44 of the torsion spring lies against a holder 15 which is fixed on a latch lever 14. The latch lever 14 is pivotally journalled on the housing 1 about a rotational axis 16. A lug 18 of a position lever 17 acts on the latch lever 14 opposite to the force of the torsion spring 13. The position lever 17 is operator accessible from the outer side 40 of the housing.

In FIG. 1, the position lever 17 is shown in the operating position 35. The position lever 17 is pivotally journalled about a rotational axis 19 and is spring biased by a torsion spring 20. The torsion spring 20 operates opposite the direction in which the lug 18 acts on the latch lever 14. The torsion spring 20 is braced on a housing-fixed stop 21 and, with its second leg, against the lug 18.

In the operating position 35 of the position lever 17, the latch lever 14 is in the operation-disabled position 45. The latch lever 14 has a latch projection 22. The operator-controlled lever 6 has a section 46 which extends on the side of the rotational axis 3 into the housing interior 41. This side of the rotational axis 3 lies opposite the operating surface 24. Latch detents 23 are formed on the section 46 and these latch detents extend on the end of the section 46 facing toward the latch projection 22. In the operation-disabled position 45, the latch projection is at a spacing to the section 46 in radial direction of the rotational axis 3 or in the peripheral direction to the rotational axis 16 of the latch lever 14.

In FIG. 1, the throttle lever 2 is shown in a first position 47 of the actuating lever 5. The set screw 7 is completely threadably engaged in the operator-controlled lever 6 so that, on the end facing toward the actuating lever 5, the set screw 7 is flush with a bushing 49. The bushing 49 is configured in the bore 10.

Figure 2:
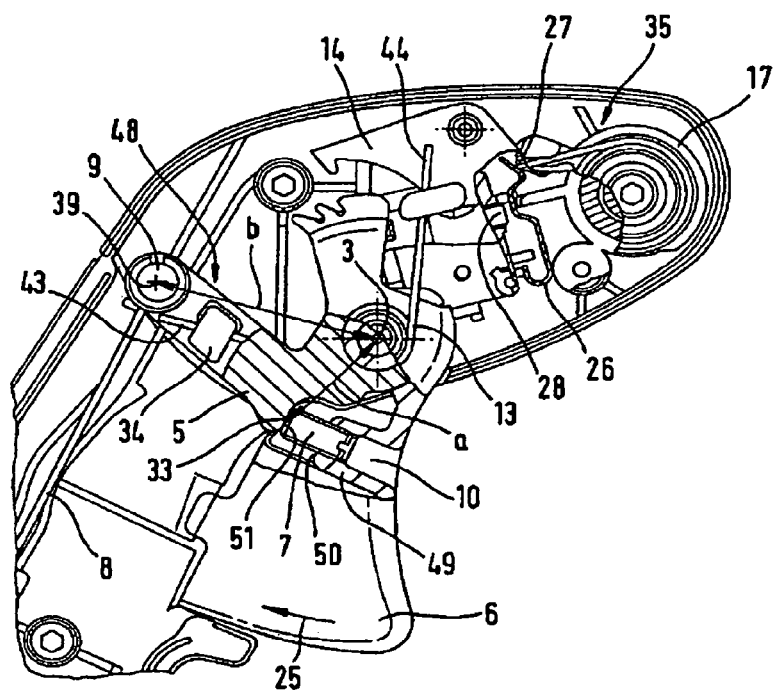

In FIG. 2, the actuating lever 5 is shown in a second position 48. In the position 48, the set screw 7 is threadably engaged in the winding 11 of the bore 10 so that the pressure surface 51 of the set screw 7 is at a spacing to the end 50 of the busing 49. The pressure surface 51 acts against the contact point 33 on the actuating lever 5 and the end 50 of the bushing 49 is the end of the bushing which faces toward the actuating lever 5. The pressure surface 51 is offset relative to the end 50 about the rotational axis 3 in the direction of arrow 25 which characterizes the direction in which the throttle lever 2 is pressed by the operator.

In the second position 48 of the actuating lever 5 shown in FIG. 2, the bowden cable 8 is more intensely actuated than in the first position 47 of the actuating lever 5 shown in FIG. 1. By rotating the set screw 7, the position of the actuating lever 5 can be adjusted in the idle position of the operator-controlled lever 6 between the first position 47 and the second position 48 until the drive motor of the work apparatus runs at idle. The bowden cable 8 operates especially on a throttle element 60 which is mounted in the induction channel of the drive motor 62 configured as an internal combustion engine. The throttle element is especially the throttle flap in a carburetor.

As FIG. 2 shows, the application point 33 is at a distance (a) to the rotational axis 3 and the application point 39 of the holder 9 (at which the bowden cable 8 acts) is at a distance (b). The distance (a) is less than the distance (b). In this way, the path, which the application point 39 passes through about the rotational axis, is greater than the path in which the set screw 7 moves the application point 33. In this way, the set screw 7 need only be adjusted by a small distance in order to achieve a greater adjustment on the bowden cable 8.

The drive motor is configured as an internal combustion engine and is ignited by a spark plug. The ignition is interrupted in order to stop the drive motor. For this purpose, a contact spring 26 is provided which can act on a contact 28. In FIG. 2, the position lever 17 is shown in the operating position 35 as in FIG. 1. An actuator 27 is mounted on the position lever 17 and acts on the contact spring 26. In the operating position 35, the contact spring 26 is at a distance to the contact 28 so that the ignition of the engine is not interrupted. The internal combustion engine is therefore in operation.

Figure 3:
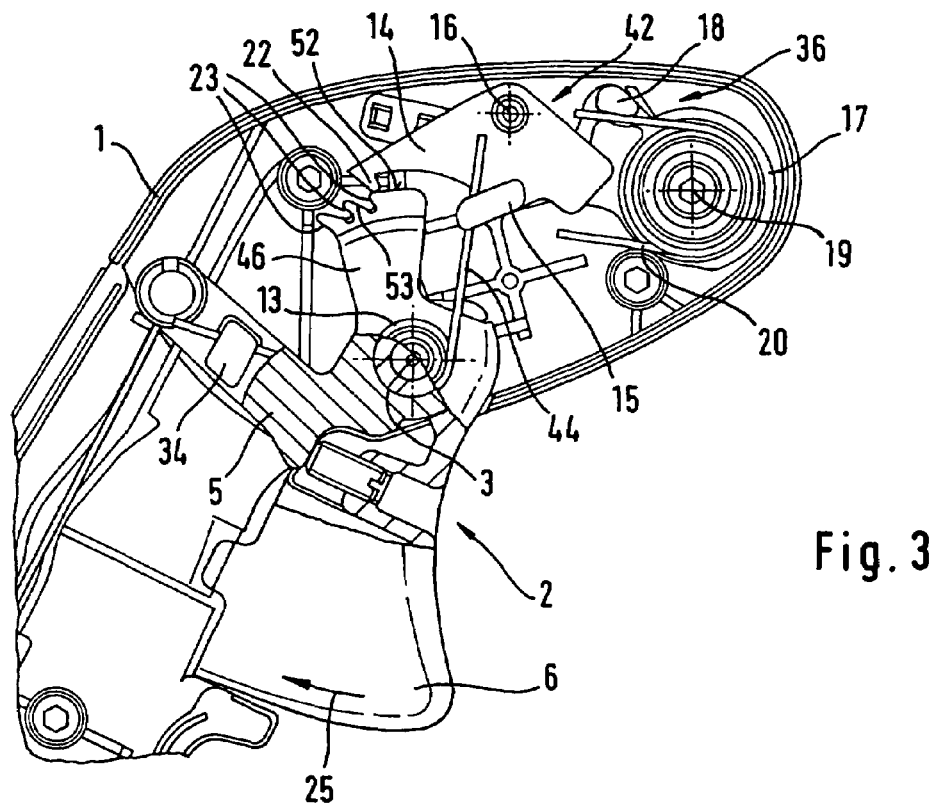
Figure 4:
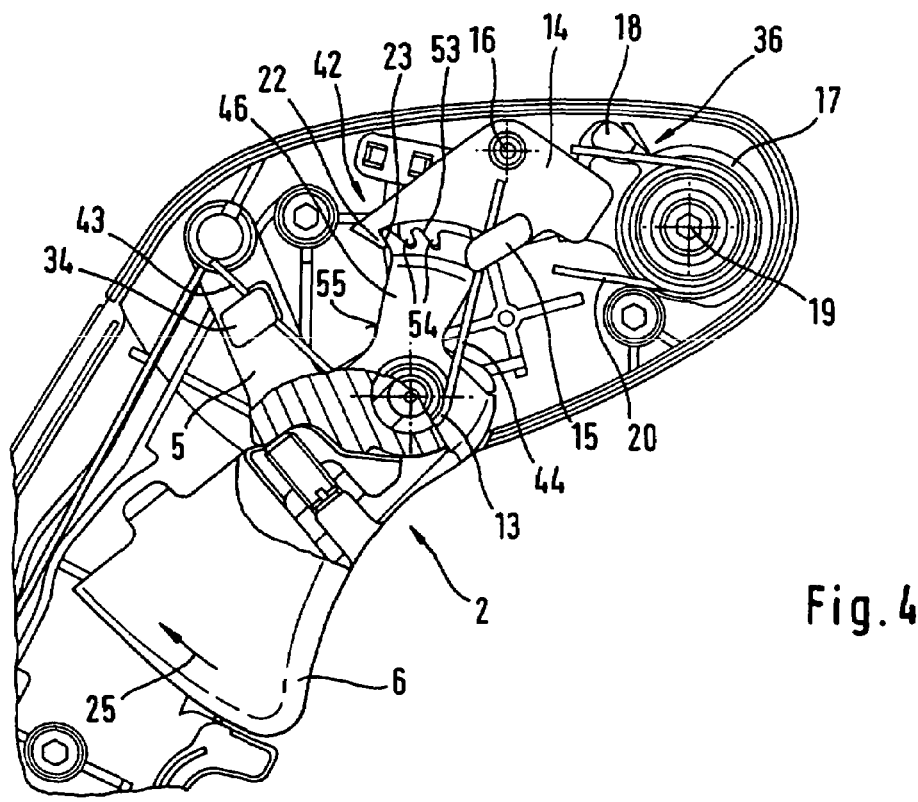

In FIGS. 3 and 4, the position lever 17 is shown in a fixing position 36. In this position, the lug 18 is rotated about the rotational axis 19 by the torsion spring 20 so that the lug 18 does not come into contact engagement with the latch lever 14. The latch lever 14 is pressed against the section 46 of the operator-controlled lever 6 via the second leg 44 of the torsion spring 13.

In FIG. 34, the throttle lever 2 is shown in the idle position. The operator-controlled lever 6 is not actuated. In this position, the latch projection 22 of the latch lever 14 lies against a surface 52 on the section 46. The throttle lever 2 can be actuated in the direction of arrow 25. When actuating the operator-controlled lever 6 in the direction of the arrow 25, the latch projection 22 engages behind latch detents 23 on the section 46 of the operator-controlled lever 6. A total of three latch detents 23 are provided which are mounted one behind the other referred to a rotation about the rotational axis 3. The latch projection 22 comes into engagement with a corresponding latch detent 23 and fixes the operator-controlled lever 6 in a direction opposite to the arrow 25.

As shown in FIG. 4, the first two latch detents 23 are configured at latch recesses 54. On the sides of the latch recesses 54 lying opposite to the latch detents 23, respective backs 53 are formed over which the latch projection 22 can slide to the next latch recess 54. In this way, an adjustment of the operator-controlled element 6 is made possible in the direction of the arrow 25, that is, from the idle position in a direction toward the full-load position. In the opposite direction, that is, from the full-load position in a direction toward the idle position, the operator-controlled lever 6 is held by the latch lever 14. In the full-load position shown in FIG. 4, the latch projection 22 lies behind a latch detent 23 which is configured on a side 55 of the section 46. The latch lever 14 is held in its latch position 42 by the torsion spring 13. In the latch position 42, the latch projection 22 is in engagement with a latch detent 23.

Figure 5:
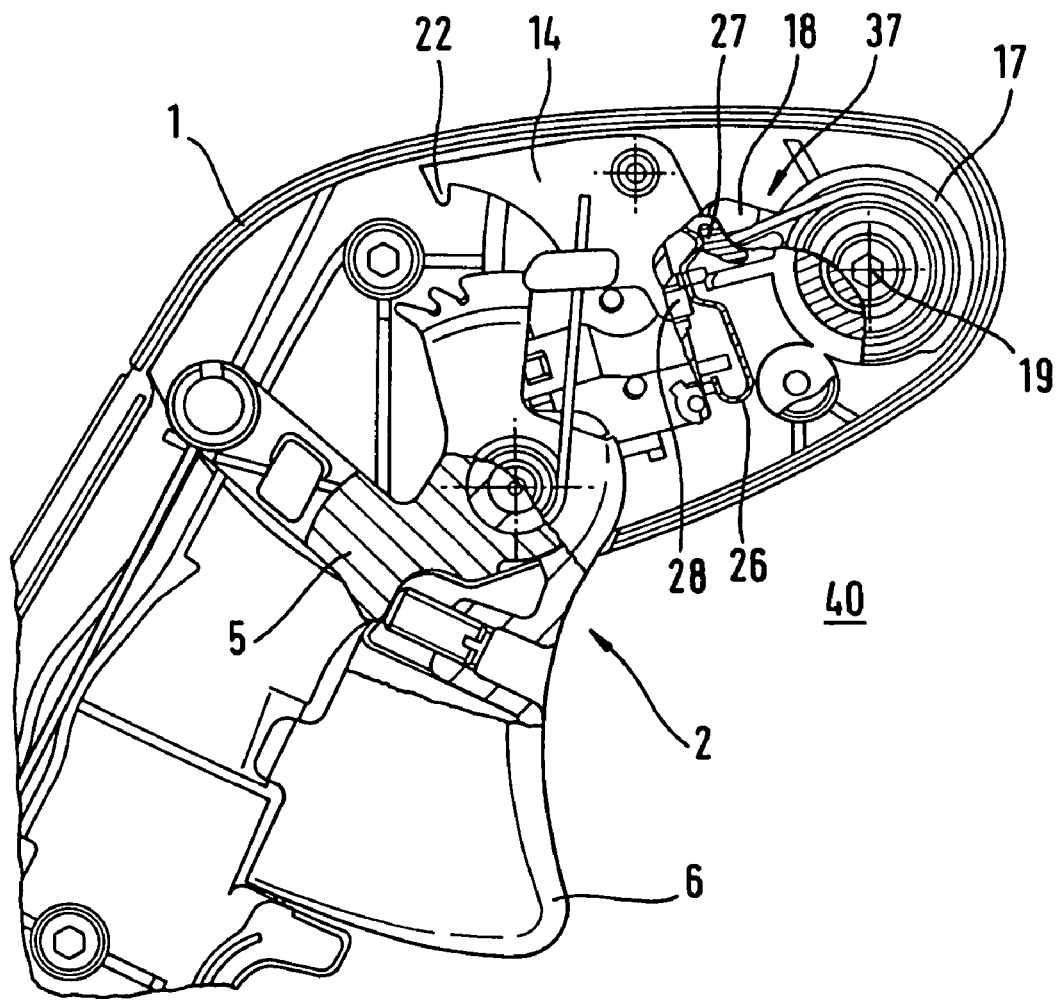

In FIG. 5, the actuating lever 17 is shown in the off position 37. The position lever 17 presses with its actuator 27 against the contact spring 26 which contacts the contact 28 in the off position 37 of the position lever 17. With the contacting, the ignition of the internal combustion engine is interrupted. In order to set the position lever 17 from the fixing position 36 shown in FIGS. 3 and 4 into the off position 37, which is shown in FIG. 5, the position lever 17 must first be rotated out of the fixing position 36 into the operating position 35 which is shown in FIGS. 1 and 2. When rotating the position lever 17 from the fixing position 36 into the operating position 35, the lug 18 presses against the latch lever 14 and releases the latching of the operator-controlled lever 6. The operator-controlled lever 6 is pressed by the torsion spring 13 into its idle position. Only with a further rotation of the position lever 17 can the off position shown in FIG. 5 be reached. In this way, it is ensured that the ignition cannot be interrupted as long as the throttle lever 2 is fixed. A starting of the internal combustion engine with a fixed throttle lever 2 is not possible. In this way, it is avoided that the operator inadvertently starts the engine in the full-load position of the throttle element in the intake channel. The position lever 17 is shifted via an actuating lever fixed on the outer side 40 of the housing. This actuating lever is not shown in FIGS. 1 to 5. Because of the bore 10, the set screw 7 can be adjusted from the operator surface 24 of the operator-controlled lever 6, that is, from the outer side 40 of the housing.

It is understood that the foregoing description is that of the preferred embodiments of the invention and that various changes and modifications may be made thereto without departing from the spirit and scope of the invention as defined in the appended claims.

What is claimed is:

1. A portable handheld work apparatus including a drive motor, the work apparatus comprising:
   an actuating arrangement for controlling said drive motor;
   a throttle lever pivotally journalled on a rotational axis and being operatively connected to said actuating arrangement for acting on said actuating arrangement to control said drive motor;
   said throttle lever including an operator-controlled lever actuable by an operator and an actuating lever for acting on said actuating arrangement;
   said actuating lever having a position relative to said operator-controlled lever;
   said throttle lever having an adjusting device for adjusting said position of said actuating lever relative to said operator-controlled lever; and,
   said adjusting device including a set element for setting said position so as to cause said actuating lever to act on said actuating arrangement to adjust an idle position and/or a full-load position of said actuating arrangement.

2. The portable handheld work apparatus of claim 1, wherein said actuating lever is journalled on said operator-controlled lever.

3. The portable handheld work apparatus of claim 2, wherein said actuating lever is pivotally journalled about said rotational axis.

4. The portable handheld work apparatus of claim 3, wherein said set element adjusts the position of said actuating lever relative to said operator-controlled element.

5. The portable handheld work apparatus of claim 4, further comprising a housing and said throttle lever being pivotally journalled on said rotational axis in said housing; and, said set element being adjustable by an operator from the outside of said housing.

6. The work apparatus of claim 1, wherein said operator-controlled lever acts on said actuating lever via said adjusting device.

7. A portable handheld work apparatus including a drive motor, the work apparatus comprising:
   an actuating arrangement for controlling said drive motor;
   a throttle lever pivotally journalled on a rotational axis and being operatively connected to said actuating arrangement for acting on said actuating arrangement to control said drive motor;
   said throttle lever including an operator-controlled lever actuable by an operator and an actuating lever for acting on said actuating arrangement;
   said actuating lever having a position relative to said operator-controlled lever;
   an adjusting device for adjusting said position of said actuating lever relative to said operator-controlled lever;
   a housing and said throttle lever being pivotally journalled in said housing;
   said adjusting device including a set element which can be manipulated by an operator from the outside of said housing to adjust said position; and,
   said throttle lever having a side projecting on the outer side of said housing and having an opening extending from said side in a direction toward said actuating lever; and, said adjusting device being arranged in said opening.

8. The portable handheld work apparatus of claim 7, wherein said actuating lever is configured as an approximately L-shaped lever having a first and second legs; said first leg has an end whereat said actuating lever is pivotally journalled about said rotational axis; and, said second leg has an end whereat said actuating arrangement acts for controlling said drive motor.

9. The portable handheld work apparatus of claim 8, wherein said first and second legs conjointly define a connecting region; and, said set element is disposed in said connecting region.

10. The portable handheld work apparatus of claim 9, wherein said set element has a contact point on said actuating lever; said actuating lever has an application point whereat said actuating arrangement acts to control said drive motor; and, said contact point is at a first distance (a) from said rotational axis and said application point is at a second distance (b) from said rotational axis greater than said first distance (a).

11. The portable handheld work apparatus of claim 10, further comprising spring biasing means for spring biasing said actuating lever in a direction toward said operator-controlled lever.

12. The portable handheld work apparatus of claim 11, wherein said spring biasing means is a torsion spring spring biasing said actuating lever.

13. The portable handheld work apparatus of claim 12, wherein said actuating arrangement further includes a bowden cable connected to said actuating lever.

14. The portable handheld work apparatus of claim 13, said work apparatus further comprising a position lever movable between a fixing position and an operating position; and, said throttle lever being fixable in at least one position when said position lever is in said fixing position and said throttle lever being enabled when said position lever is in said operating position.

15. The portable handheld work apparatus of claim 14, said work apparatus further comprising a latch lever and said throttle lever being fixed via said latch lever when said position lever is in said fixing position.

16. The portable handheld work apparatus of claim 15, wherein said spring biasing means is a first spring biasing means and said work apparatus further comprises a second spring biasing means for spring biasing said latch lever.

17. The work apparatus of claim 16, wherein said torsion spring is a first torsion spring and said second biasing means is a second torsion spring for spring biasing said latch lever; and, said second torsion spring has a first leg supported on said actuating lever and a second leg supported on said latch lever.

18. The work apparatus of claim 17, wherein said position lever operates against the spring force on said latch lever when in said operating position.

19. The work apparatus of claim 18, wherein said operator-controlled lever has latch detents formed thereon; and, said latch lever has a latch projection which coacts with said latch detents when said position lever is in said fixing position.

20. The work apparatus of claim 19, further comprising a spring contact for interrupting the ignition of said drive motor; and, said position lever being movable into an off position wherein said position lever actuates said spring contact to interrupt said ignition.

21. The work apparatus of claim 20, wherein said operating position of said position lever is arranged between said fixing position and said off position.

22. A portable handheld work apparatus including a drive motor, the work apparatus comprising:
   an actuating arrangement for controlling said drive motor;
   a throttle lever pivotally journalled on a rotational axis and being operatively connected to said actuating arrangement for acting on said actuating arrangement to control said drive motor;
   said throttle lever including an operator-controlled lever actuable by an operator and an actuating lever for acting on said actuating arrangement;
   said actuating lever having a position relative to said operator-controlled lever;
   an adjusting element for adjusting said position of said actuating lever relative to said operator-controlled lever; and,
   said adjusting element being a screw.

23. A portable handheld work apparatus including a drive motor, the work apparatus comprising:
   an actuating arrangement for controlling said drive motor;
   a throttle lever pivotally journalled on a rotational axis and being operatively connected to said actuating arrangement for acting on said actuating arrangement to control said drive motor when said throttle lever is moved in an operating direction;
   said throttle lever including an operator-controlled lever actuable by an operator and an actuating lever for acting on said actuating arrangement;
   said actuating lever having a position relative to said operator-controlled lever;
   means for adjusting said position of said actuating lever relative to said operator-controlled lever in said operating direction to adjust said actuating arrangement between a first location of said actuating lever and a second location thereof so as to cause said actuating arrangement to be actuated stronger in said second location of said actuating lever than in said first location thereof; and,
   said operator-controlled lever remaining in the same position for both of said first and second locations of said actuating lever.

\* \* \* \* \*

UNITED STATES PATENT AND TRADEMARK OFFICE
CERTIFICATE OF CORRECTION

PATENT NO. : 7,484,431 B2
APPLICATION NO. : 10/891012
DATED : February 3, 2009
INVENTOR(S) : Matthias Mueller and Harald Schliemann It is certified that error appears in the above-identified patent and that said Letters Patent is hereby corrected as shown below:

In column 2:
Line 61: delete "devices" and substitute -- device -- therefor.

In column 4:
Line 20: delete "busing" and substitute -- bushing -- therefor.
Line 65: delete "FIG. 34" and substitute -- FIG. 3 -- therefor.

In column 6:
Line 56: delete "a".

Signed and Sealed this

Twenty-fourth Day of March, 2009

JOHN DOLL
*Acting Director of the United States Patent and Trademark Office*